United States Patent
Zhang et al.

(10) Patent No.: US 10,176,786 B2
(45) Date of Patent: Jan. 8, 2019

(54) PREVENTING SCREEN ROTATION DURING USE

(71) Applicant: LENOVO (Singapore) PTE, LTD., New Tech Park (SG)

(72) Inventors: Jianbang Zhang, Cary, NC (US); Jian Li, Chapel Hill, NC (US); Ming Qian, Cary, NC (US); Song Wang, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 26 days.

(21) Appl. No.: 14/955,308

(22) Filed: Dec. 1, 2015

(65) Prior Publication Data

US 2017/0154610 A1    Jun. 1, 2017

(51) Int. Cl.
*G09G 5/38* (2006.01)
*G06F 3/0488* (2013.01)
*G06F 17/24* (2006.01)
*G06F 3/0484* (2013.01)
*G06F 1/16* (2006.01)

(52) U.S. Cl.
CPC ............ *G09G 5/38* (2013.01); *G06F 1/1694* (2013.01); *G06F 3/04847* (2013.01); *G06F 3/04883* (2013.01); *G06F 3/04886* (2013.01); *G06F 17/24* (2013.01); *G06F 2200/1614* (2013.01)

(58) Field of Classification Search
None
See application file for complete search history.

(56) References Cited

U.S. PATENT DOCUMENTS

| | | | | |
|---|---|---|---|---|
| 7,506,275 B2* | 3/2009 | Conradt | ................ | G06F 3/0481 715/834 |
| 2002/0021278 A1* | 2/2002 | Hinckley | .............. | G06F 1/1626 345/156 |
| 2003/0001899 A1* | 1/2003 | Partanen | ............... | G06F 3/0481 715/800 |
| 2004/0127267 A1* | 7/2004 | Wong | .................... | G06F 1/1616 455/575.1 |
| 2006/0061551 A1* | 3/2006 | Fateh | .................... | G06F 1/1626 345/158 |
| 2008/0259094 A1* | 10/2008 | Kim | ....................... | G06F 1/1626 345/651 |
| 2010/0001980 A1* | 1/2010 | Kim | ...................... | G06F 1/1626 345/184 |

(Continued)

*Primary Examiner* — Edward Martello
(74) *Attorney, Agent, or Firm* — Kunzler, PC

(57) ABSTRACT

For preventing a display from automatically rotating while receiving input from a user, an apparatus, method, and computer program product are disclosed. The apparatus includes a display device for presenting the user interface, a processor, and a memory that stores code executable by the processor. The processor (by executing the code) monitors for a user input event, prevents rotation of the user interface for a predetermined amount of time responsive to detecting the user input event, and allows rotation of the user interface responsive to expiration of the predetermined amount of time. The processor may initiate a timer to measure the predetermined amount of time. The processor may further detect an additional user input event during the predetermined amount of time and reset that the predetermined amount of time, responsive to detecting the additional user input event.

20 Claims, 4 Drawing Sheets

(56) References Cited

U.S. PATENT DOCUMENTS

| | | | |
|---|---|---|---|
| 2011/0050729 A1* | 3/2011 | Li | G06F 3/013 |
| | | | 345/649 |
| 2011/0167375 A1* | 7/2011 | Kocienda | G06F 1/3203 |
| | | | 715/773 |
| 2012/0056830 A1* | 3/2012 | Suzuki | G06F 1/1626 |
| | | | 345/173 |
| 2013/0135352 A1* | 5/2013 | Matsuda | G06F 3/14 |
| | | | 345/659 |
| 2013/0174082 A1* | 7/2013 | Khandker | G06F 3/0485 |
| | | | 715/780 |
| 2015/0261264 A1* | 9/2015 | Brown | G06F 3/0221 |
| | | | 345/174 |

* cited by examiner

PREVENTING SCREEN ROTATION DURING USE

BACKGROUND

Field

The subject matter disclosed herein relates to automatically rotating a display and more particularly relates to preventing a display from automatically rotating while receiving input from a user.

Description of the Related Art

Handheld mobile devices equipped with display screen often have an auto-rotate function that senses the orientation of the mobile device with respect to a downward direction and automatically rotates the screen (e.g., user interface) to an alignment that best aligns the downward direction with the bottom of the screen. However, the auto-rotate function becomes annoying while user is typing on mobile devices, as the phone screen will auto-rotate because of any small movement. Further, if an application that is not well written to maintain the state, user might even lose all the text already typed if the auto-rotation occurs while the user is typing.

BRIEF SUMMARY

An apparatus for preventing a display from automatically rotating while receiving input from a user is disclosed. A method and computer program product also perform the functions of the apparatus.

The apparatus includes a display device for presenting a user interface, a processor, and a memory that stores code executable by the processor. Upon executing the code, the processor monitors for a user input event, prevents rotation of the user interface for a predetermined amount of time in response to detecting the user input event, and allows rotation of the user interface in response to expiration of the predetermined amount of time.

In some embodiments, the processor further initiates the timer in response to detecting the user input event, the timer measuring the predetermined amount of time. In certain embodiments, allowing rotation of the display to user interface in response to expiration of the predetermined amount of time includes allowing rotation of the user interface includes in response to expiration of the timer. In one embodiment, the processor further monitors for a screen rotation event, wherein preventing rotation of the user interface for the predetermined amount of time includes preventing reporting of a detected screen rotation event.

In some embodiments, the processor further detects an additional user input event during the predetermined amount of time and resets the predetermined amount of time responsive to detecting the additional user input event. In one embodiment, detecting the user input event may include detecting whether an on-screen software keyboard is being used. In another embodiment, detecting a user input event may include detecting a plurality of single-tap touch events within a threshold time frame. In yet another embodiment, detecting the user input event may include detecting text being inserted into a text input field.

The method includes detecting, by use of a processor, a user input event, preventing rotation of a displayed user interface for a predetermined amount of time in response to detecting the user input event, and allowing rotation of the displayed user interface in response to expiration of the predetermined amount of time. The method may also include initiating a timer in response to detecting the user input event, the timer measuring the predetermined amount of time. In certain embodiments, allowing rotation of the displayed user interface in response to expiration of the predetermined amount of time includes allowing rotation of the displayed user interface in response to expiration of the timer.

In some embodiments, the method may also include monitoring for a screen rotation event. In such embodiments, preventing rotation of the displayed user interface for the predetermined amount of time may include preventing reporting of the screen rotation event. In certain embodiments, the method includes detecting an additional user input event during the predetermined amount of time and resetting the predetermined amount of time responsive to detecting the additional user input event.

In one embodiment, detecting the user input event may include detecting a plurality of single-tap touch events within a threshold time frame. In another embodiment, detecting the user input event may include detecting that a user is typing. In certain embodiments, detecting that a user is typing includes detecting that an on-screen software keyboard is being used. In other embodiments, detecting that a user is typing includes detecting text being inserted into a text input field.

The computer program product includes computer readable storage media that stores code executable by a processor, the executable code comprising code to perform: monitoring for a user input event, preventing rotation of a displayed user interface for a predetermined amount of time in response to detecting the user input event, and allowing rotation of the displayed user interface in response to expiration of the predetermined amount of time. The executable code may further include code to initiate a timer in response to detecting the user input event, the timer measuring the predetermined amount of time. The executable code may further include code to detect an additional user input event during the predetermined amount of time and reset the predetermined amount of time. In certain embodiments, detecting the user input event includes detecting that a user is typing and/or detecting a voice input from the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
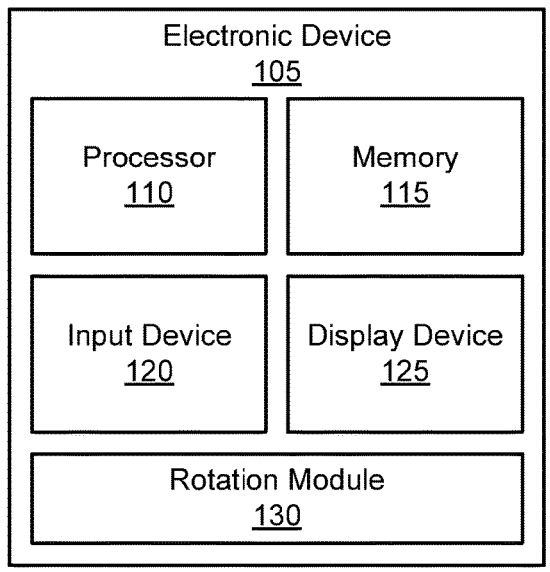
FIG. 1 is a schematic block diagram illustrating one embodiment of a system for preventing a display from automatically rotating while receiving input from a user.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein monitor a user's activity on a mobile device and temporarily disable an auto-rotate function when certain criteria are met. In particular, user input (e.g., typing, tapping, voice command) may detected and the auto-rotate may be disabled until there is no more input activities for a (short) predetermined amount of time. Techniques for detecting whether the user is typing include: detecting frequent single-tap touch events on a touchscreen, detecting in an on-screen software keyboard is open and/or in use, and detecting if text has already been input into any text input field.

In some embodiments, a small timing window (e.g., 2-3 seconds) is created when user input activity is detected. For example, a timer may be activated. During the time window, any screen rotate command (e.g., generated by an operating system or process executing on the mobile device) will be filtered out or blocked. Any continuing user input activity will refresh the timing window (e.g., reset the timer). If no more user input activity is detected in the timing window (e.g., if the timer expires before it can be reset by continuing activity), then the screen rotate commands will no longer be filtered out or blocked and the auto-rotate feature will be re-enabled.

FIG. 1 is a schematic block diagram illustrating a system 100 for preventing a display from automatically rotating while receiving input from a user. The system 100 includes an electronic device 105. In one embodiment, the electronic device 105 includes a processor 110, a memory 115, a rotation module 130, an input device 120, and a display device 125.

The electronic device 105 may be any digital device capable of executing computing processes using a microprocessor, microcontroller, or other processing device, including, but not limited to, a general-purpose computing device, a special-purpose (dedicated) computing device, and the like. In some embodiments, the electronic device 105 may be a personal computer, including, but not limited to, a mobile phone, a smart phone, a tablet computer, a laptop computer, a handheld computer, a wearable computer, a gaming console, or the like.

The processor 110, in one embodiment, may comprise any known controller capable of executing computer-readable instructions and/or capable of performing logical operations. For example, the processor 110 may be a microcontroller, a microprocessor, a central processing unit (CPU), a graphics processing unit (GPU), an auxiliary processing unit, a FPGA, or similar programmable controller. In certain embodiments, the processor 110 may include a plurality of processing units, such as a plurality processing cores, a plurality of CPUs, a plurality of microcontrollers, or the like. In some embodiments, the processor 110 executes instructions stored in the memory 115 to perform the methods and routines described herein. The processor 110 is communicatively coupled to the memory 115, the input device 120, the display device 125, and the rotation module 130.

The memory 115, in one embodiment, is a computer readable storage medium. In some embodiments, the memory 115 includes volatile computer storage media. For example, the memory 115 may include a random access memory (RAM), including dynamic RAM (DRAM), synchronous dynamic RAM (SDRAM), and/or static RAM (SRAM). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores additional data relating to preventing a display from automatically rotating while receiving input from a user, for example, the memory 115 may store user input events, UI rotation events, a screen orientation, and the like. In some embodiments, the memory 115 also stores program code and related data, such as an operating system or other controller algorithms operating on the electronic device 105.

The input device 120, in one embodiment, may comprise any known computer input device including a touch panel, a button, a keyboard, and the like. The input device 120 is configured to receive input from a user, for example touch input, key press input, and the like. In some embodiments, the input device 120 may be integrated with the display device 125, for example as a touchscreen or similar touch-sensitive display. For example, the user may input text via software keyboard displayed on a touchscreen and/or writing upon the touchscreen. In certain embodiments, the input device 120 may be configured to generate a user input event in response to receiving input from the user In certain embodiments, the input device 120 may include a microphone or other suitable device for receiving voice input from the user. For example, the user may speak one or more commands, wherein input device 120 receives the one or more commands as voice input. In certain embodiments, the input device 120 may be configured to generate a voice input event in response to receiving voice input from the user.

The display device 125, in one embodiment, may comprise any known electronic display capable of outputting visual data to a user. For example, the display device 125 may be an LCD display, an LED display, an OLED display, a projector, or similar display device capable of outputting images, text, characters, and the like to a user. As used herein, the display device 125 refers to a physical electronic display composing the electronic device 105. The display device 125 displays a user interface, such as a graphical user interface (GUI), sometimes referred to as a "screen." As used herein, a screen refers to the content presented on the display device 125, such as a GUI, a window or other graphical control element of the GUI, and the like.

In some embodiments, the display device 125 may be integrated with at least a portion of the input device 120. For example, the display device 125 and a touch panel of the input device 120 may be combined to form a touchscreen or similar touch-sensitive display. The display device 125 may receive data for display from the processor 110, the memory 115, and/or the rotation module 130.

The rotation module 130, in one embodiment, is configured to detect user input activity and temporarily prevent rotation of the user interface displayed on the display device 125, as described in further detail below. In some embodiments, the rotation module 130 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

Figure 2:
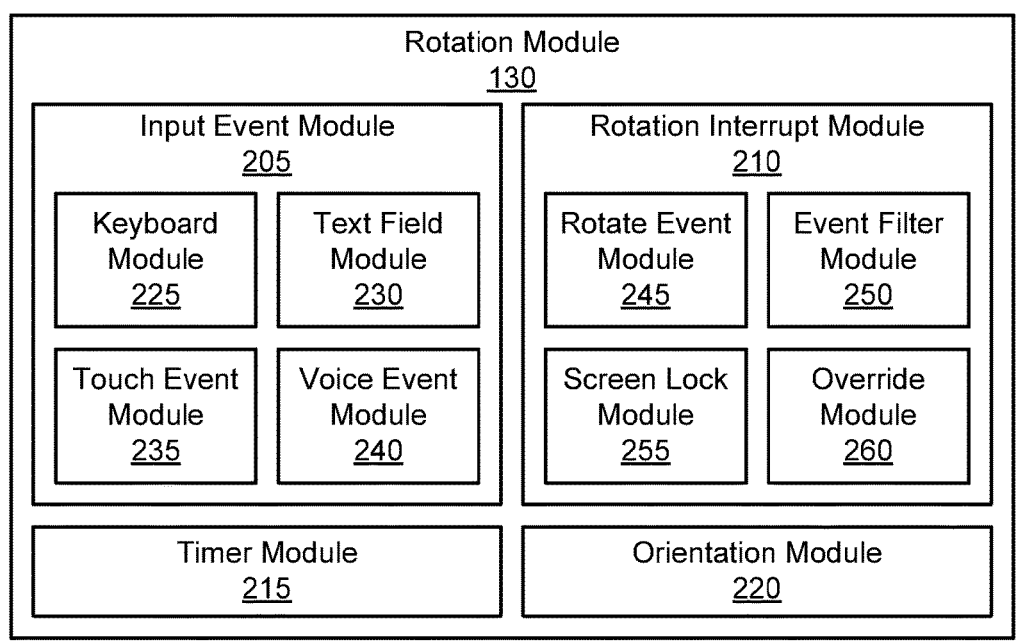
FIG. 2 is a schematic block diagram illustrating one embodiment of an apparatus for preventing a display from automatically rotating while receiving input from a user.

FIG. 2 is a schematic block diagram illustrating an apparatus 200 for preventing a display from automatically rotating while receiving input from a user. The apparatus 200 includes a rotation module 130. In some embodiments, the rotation module 130 is substantially similar to the rotation module 130 described above with reference to FIG. 1. In one embodiment, the rotation module 130 includes input event module 205 and a rotation interrupt module 210. In further embodiments, the rotation module 130 may additionally include one or more of a timer module 215, an orientation module 220, a keyboard module 225, a text field module 230, a touch event module 235, a voice event module 240, a rotate event module 245, an event filter module 250, a screen lock module 255, and an override module 260. The modules 205-260 may be communicatively coupled to one another.

The input event module 205, in one embodiment, is configured to monitor for and detect a user input event. As used herein, a user input event refers to a computing event generated in response to the input device 120 receiving user input. A user input event may be generated in response to the user tapping a touchscreen, inputting text, handwriting text, pressing a key/button of the input device 120, speaking voice command, or the like. In response to detecting the user input event, the input event module 205 may signal the rotation interrupt module 210, wherein the rotation interrupt module 210 prevents rotation of a user interface (UI), e.g., a graphical user interface (GUI), for a predetermined amount of time in response to detecting the user input event.

In one embodiments, the input event module 205 detects a user input event by detecting that an on-screen keyboard (e.g., a software keyboard displayed on a touchscreen display device) is actively displayed. In further embodiments, the input event module 205 detects the user input event by detecting that the on-screen keyboard is being used (e.g., the user is interacting with the on-screen keyboard). Detecting that the on-screen keyboard is being used may include detecting user touch in regions of the touchscreen corresponding to the displayed on-screen keyboard).

In another embodiments, the input event module 205 detects a user input event by (additionally or alternatively) detecting two or more single-tap touch events within the threshold time frame, the threshold time frame based on an average amount of time between successive key presses of an on-screen keyboard. In yet another embodiment, the input event module 205 may detect a user input event by detecting that text is being inserted into a text input field, for example a text input field being actively displayed in the user interface. In still other embodiments, the input event module 205 may detect a user input event by detecting voice input from the user.

In certain embodiments, the input event module 205 is further configured to monitor for additional user input events in response to the rotation interrupt module 210 preventing rotation of the UI. For example, the rotation interrupt module 210 may lock a UI orientation for a predetermined amount of time in response to an initial user input event detected by the input event module 205, wherein the input event module 205 may monitor for additional input. In response to detecting an additional user input event, the rotation interrupt module 210 may reset the amount of time for which the UI orientation is locked. The input event module 205 may comprise hardware circuits, program code operating on a processing device, or a combination of hardware circuitry and program code The rotation interrupt module 210, in one embodiment, is configured to temporarily prevent rotation of the user interface (UI) in response to the input event module 205 detecting a user input event. In certain embodiments, the rotation interrupt module 210 prevents rotation of the UI for a predetermined amount of time in response to the input event module 205 detecting a user input event. The predetermined amount of time may be a default value and/or a user defined. As used herein, preventing rotation of the UI refers to maintaining an orientation of a UI (e.g., a graphical user interface such as a screen, window, etc.) with respect to the physical display device 125 despite a trigger to rotate the UI due to orientation of the electronic device 105. The rotation interrupt module 210 maintains the orientation of the UI while the user is inputting text, voice commands, or the like.

The rotation interrupt module 210 is configured to prevent rotation of the user interface until the expiration of a predetermined amount of time. In certain embodiments, the rotation interrupt module 210 may receive an indication of additional user input events from the input event module 205 during the predetermined amount of time, in such embodiments, the rotation interrupt module 210 may reset the predetermined amount of time. For example, the predetermined amount of time is equal to 3 seconds, the input event module 205 may detect a second user input event 0.5 seconds into the predetermined amount of time, and signal the rotation interrupt module 210, wherein the rotation interrupt module 210 prevents rotation of the user interface for an additional 3 seconds after the second user input event. Thus, if no additional user input events are detected, the rotation interrupt module 210 will prevent rotation of the user interface for a total of 3.5 seconds.

In some embodiments, the rotation interrupt module 210 prevents rotation of the UI by monitoring for a screen rotation event and preventing reporting of the screen rotation event. As used herein, a screen rotation event refers to a computer event generated in response to the orientation of the electronic device (with respect to a downward direction) being within a certain range. For example, a screen rotation event is generated in response to the user rotating the electronic device 105 such that an edge of the display device 125 that was previously closest the ground is no longer the closest edge to the ground. The screen rotation event may indicate a direction and amount of screen rotation to maintain a desired orientation of the user interface with respect to the downward direction.

In other embodiments, the rotation interrupt module 210 prevents rotation of the UI by locking a current screen orientation. For example, the rotation interrupt module 210 may signal an operating system of the electronic device 105 to lock the UI in its current screen orientation. As used herein, a screen orientation refers to the orientation of the UI (e.g., the screen) with respect to the physical display device 125. Also as used herein, a current screen orientation refers to the screen orientation at the time user input the event is detected. When the rotation interrupt module 210 locks the UI in its current screen orientation, the orientation of the user interface with respect to the electronic device 105 does not change even if the orientation of the user interface with respect to a downward direction changes.

The rotation interrupt module 210 is further configured to allow rotation of the UI after a predetermined amount of time has elapsed. As used herein, allowing rotation of the UI refers to the rotation interrupt module 210 permitting an auto-rotate function to change the screen orientation as the orientation of the electronic device 105 changes. In some embodiments, the rotation interrupt module 210 allows rotation of the UI by unlocking the current screen orientation (e.g., signaling the operating system to unlock the screen orientation). In other embodiments, the rotation interrupt module 210 allows rotation of the UI by passing along a screen rotation event generated in response to the user rotating the electronic device 105. The rotation interrupt module 210 may comprise hardware circuits, program code operating on a processing device, or a combination of hardware circuitry and program code The timer module 215, in one embodiment, is configured to track the amount of elapsed time up to the predetermined amount of time will for which the rotation interrupt module 210 is rotation of the user interface (UI). In certain embodiments, the timer module 215 may be implemented using a hardware timer, a software timer, or combinations thereof. In one embodiment, the timer module 215 receives a signal from the rotation interrupt module 210. For example, the rotation a module 210 may signal the timer module 215 in response to preventing rotation of the UI. In another embodiment, the timer module 215 may detect that the rotation interrupt module 210 is preventing rotation of the UI. For example, the timer module 215 may detect that the rotation interrupt module 210 has activated a rotation event blocker, locked the screen orientation, set a prevention flag indicating that screen auto-rotation is being prevented, or the like.

In certain embodiments, the timer module 215 signals the rotation interrupt module 210 in response to expiration of the predetermined amount of time. For example, when the hardware/software timer reaches zero, the timer module 215 may indicate to the rotation interrupt module 210 that the predetermined amount of time has expired, wherein the rotation interrupt module 210 allows rotation of the UI in response to expiration of the predetermined amount of time. In other embodiments, the timer module 215 may set an expiration flag in the memory 115 in response to expiration of the predetermined amount of time, the flag indicative of expiration of the predetermined amount of time. The rotation interrupt module 210 may monitor the state of the expiration flag and allow rotation of the user interface in response to the timer module 215 setting the expiration flag.

The orientation module 220, in one embodiment, is configured to identify an orientation of the electronic device 105 with respect to a downward direction. In further embodiments, the orientation module 220 may also be configured to identify a screen orientation of the user interface with respect to the display device 125, for example identifying a current screen orientation of the user interface. In one embodiment, the orientation module 220 determine a screen orientation that places the bottom of the user interface near an edge of the display device 125 closest to the ground. In another embodiment, the orientation module 220 determines a screen orientation that aligns the bottom of the user interface with the downward direction.

In some embodiments, the orientation module 220 may provide an auto-rotation function by generating screen rotation events in response to changes in the orientation of the electronic device 105 with respect to a downward direction. For example, the orientation module 220 may generate a screen rotation event in response to the current screen orientation not having the bottom of the user interface near an edge of the display device 125 closest the ground. Alternatively, the orientation module 220 may generate a screen rotation event in response to these current line bottom of the user interface with a direction. In response to the module 220 generating a screen rotation event, the rotation module 130 may rotate the user interface based on the screen rotation event so as to automatically rotate the screen (e.g., user interface) to an alignment that best aligns the downward direction with the bottom of the screen.

In certain embodiments, the orientation module 220 receives a rotation prevention signal from the rotation interrupt module 210, wherein the orientation module 220 suppresses (e.g., does not generate) screen rotation events in response to receiving the rotation prevention signal. In further embodiments, the rotation interrupt module 210 may send a rotation resumption signal to the orientation module 220 after expiration of the predetermined amount of time, wherein the wherein the orientation module 220 resumes generating screen rotation events in response to receiving the rotation resumption signal.

In certain embodiments, the rotation interrupt module 210, in response to expiration of the predetermined amount of time, may signal the orientation module 220 to determine a current orientation of the electronic device 105 and to generate a screen rotation event, if necessary. Accordingly, once the rotation interrupt module 210 ceases preventing rotation of the user interface, the orientation module 220 may generate (if needed) a screen rotation event so as to best align the downward direction with the bottom of the screen. The orientation module 220 may comprise hardware circuits, program code operating on a processing device, or a combination of hardware circuitry and program code The keyboard module 225, in one embodiment, is configured to monitor for keyboard input events. As used herein, a keyboard input event refers to an input event generated by the user using the on-screen keyboard (e.g., a software keyboard displayed on the display device 125). In one embodiment, the keyboard module 225 determines whether an on-screen keyboard is being displayed, and generates a typing event in response to determining that the on-screen keyboard is being's displayed. As used herein, a typing event refers to a user activity event indicative of the user typing (e.g., inputting text).

In a further embodiment, the keyboard module 225 may determine whether the on-screen keyboard is being used (e.g., whether the user is pressing softkeys corresponding to the on-screen keyboard), and generates a typing event only in response to determining that the on-screen keyboard is being used. In another embodiment, the keyboard module 225 initiates a software listener that detects keyboard input events generated by the input device 120 and generates a typing event based on the detected keyboard input events.

The keyboard module 225 may comprise hardware circuits, program code operating on a processing device, or a combination of hardware circuitry and program code. As depicted, the keyboard module 225 may be a component of the input event module 205. For example, the keyboard module 225 may be a hardware component of the input event module 205. As another example, the keyboard module 225 may be a subroutine of the input event module 205. However, in other embodiments the keyboard module 225 may be an independent component communicatively coupled to the input event module 205.

The text field module 230, in one embodiment, is configured to monitor for text input events. As used herein, a text input event refers to an input event generated by the user inserting text into a text input field (e.g., via an on-screen keyboard, voice dictation, or the like). In one embodiment, the text field module 230 initiates a software listener that detects text input events generated by the input device 120 and generates a typing event based on the detected text input events. For example, the text field module 230 monitors output of the input device 120 to detect whether text is being inserted into a text input field, and generates a typing event in response to determining that text is being inserted into the text input field.

The text field module 230 may comprise hardware circuits, program code operating on a processing device, or a combination of hardware circuitry and program code. As depicted, the text field module 230 may be a component of the input event module 205. For example, the text field module 230 may be a hardware component of the input event module 205. As another example, the text field module 230 may be a subroutine of the input event module 205. However, in other embodiments the text field module 230 may be an independent component communicatively coupled to the input event module 205.

The touch event module 235, in one embodiment, is configured to monitor for touch input events. As used herein, a touch input event refers to an input event generated by the user speaking (e.g., speaking a voice command, dictating text, or the like). In one embodiment, touch event module 235 may monitor for single-tap touch events generated by the input device 120. For example, the touch event module 235 may initiate a software listener that detects touch input events generated by the input device 120 in response to single-taps.

In a further embodiment, the touch event module 235 may monitor timing between successive single-tap touch events, wherein the touch event module 235 generates a typing event in response to detecting a plurality of single-tap touch events within a threshold time frame. In one embodiment, the threshold time frame is less than the predetermined amount of time for which the rotation interrupt module 210 prevents her rotation of the user interface. In another embodiment, the threshold time frame is configured to capture user activity indicative of text being input via on-screen keyboard, commands being input via an on-screen control panel, or the like.

The touch event module 235 may comprise hardware circuits, program code operating on a processing device, or a combination of hardware circuitry and program code. As depicted, the touch event module 235 may be a component of the input event module 205. For example, the touch event module 235 may be a hardware component of the input event module 205. As another example, the touch event module 235 may be a subroutine of the input event module 205. However, in other embodiments the touch event module 235 may be an independent component communicatively coupled to the input event module 205.

The voice event module 240, in one embodiment, is configured to monitor for voice input events. As used herein, a voice input event refers to an input event generated by the user speaking (e.g., speaking a voice command, dictating text, or the like). In one embodiment, the voice event module 240 initiates a software listener that detects voice input events generated by the input device 120. In another embodiment, the voice event module 240 monitors output of a voice recognition engine to detect a voice input event.

The voice event module 240 may comprise hardware circuits, program code operating on a processing device, or a combination of hardware circuitry and program code. As depicted, the voice event module 240 may be a component of the input event module 205. For example, the voice event module 240 may be a hardware component of the input event module 205. As another example, the voice event module 240 may be a subroutine of the input event module 205. However, in other embodiments the voice event module 240 may be an independent component communicatively coupled to the input event module 205.

The rotate event module 245, in one embodiment, is configured to monitor for screen rotation events. In one embodiment, the rotate event module 245 uses a software listener to detect a screen rotation event. In another embodiment, the rotate event module 245 receives notifications from the operating system running on the electronic device 105, the notifications indicative of a screen rotation event. In response to detecting a screen rotation event, the rotate event module 225 may signal the event filter module 250, wherein the event filter module 250 may suppress the screen rotation event based on user activity.

The rotate event module 245 may comprise hardware circuits, program code operating on a processing device, or a combination of hardware circuitry and program code. As depicted, the rotate event module 245 may be a component of the rotation interrupt module 210. For example, the rotate event module 245 may be a hardware component of the rotation interrupt module 210. As another example, the rotate event module 245 may be a subroutine of the rotation interrupt module 210. However, in other embodiments the rotate event module 245 may be an independent component communicatively coupled to the rotation interrupt module 210.

The event filter module 250, in one embodiment, is configured to filter out or block the reporting of screen rotation events in response to user activity. For example, in response to the input event module 205 identifying user input activity, the event filter module 250 may filter out or block the reporting of screen rotation events for a predetermined amount of time. In one embodiment, the event filter module 250 receives signals from the input event module 205 and from the screen rotation event module 245. The input event module 205 may notify the event filter module 250 of user input activity, wherein the event filter module 250 initiates the predetermined amount of time during which reporting of screen rotation events are to be suppressed. The rotate event module 245 may notify the event filter module 250 of rotation events, wherein the event filter module may filter out or block (e.g., suppress) reporting of the rotation events during the predetermined amount of time.

The event filter module 250 may comprise hardware circuits, program code operating on a processing device, or a combination of hardware circuitry and program code. As depicted, the event filter module 250 may be a component of the rotation interrupt module 210. For example, the event filter module 250 may be a hardware component of the rotation interrupt module 210. As another example, the event filter module 250 may be a subroutine of the rotation interrupt module 210. However, in other embodiments the event filter module 250 may be an independent component communicatively coupled to the rotation interrupt module 210.

The screen lock module 255, in one embodiment, is configured to prevent rotation of the displayed user interface by locking a screen orientation of the user interface. In one embodiment, the screen lock module 255 locks the screen orientation by sending a request to an operating system of the electronic device 105. In another embodiment, the screen lock module 255 locks the screen orientation by setting a screen orientation parameter. In yet another embodiment, the screen lock module 255 may lock the screen orientation by disabling a sensor used to detect the orientation of the electronic device 105.

The screen lock module 255 may comprise hardware circuits, program code operating on a processing device, or a combination of hardware circuitry and program code. As depicted, the screen lock module 255 may be a component of the rotation interrupt module 210. For example, the screen lock module 255 may be a hardware component of the rotation interrupt module 210. As another example, the screen lock module 255 may be a subroutine of the rotation interrupt module 210. However, in other embodiments the screen lock module 255 may be an independent component communicatively coupled to the rotation interrupt module 210.

The override module 260, in one embodiment, is configured to allow rotation of the displayed user interface prior to expiration of the predetermined amount of time. In one embodiment, the override module 260 may detect user activity indicative that the user is finished inputting text (or the like). Accordingly, if the user performs an activity indicative that the user is finished typing (or performing other user input), then the override module 260 may detect this user activity and signal the rotation interrupt module 210 to allow rotation of the UI even if the predetermined amount of time has not expired. Examples of actions indicative that the user has finished typing (or performing other input activity) include, but are not limited to, the user pressing a "return" or "enter" button on the on-screen keyboard 308, the user pressing a "send" button in a messaging window on, the user selecting away from a text input field, the user setting down or releasing the electronic device 105, and the like.

The override module 260 may comprise hardware circuits, program code operating on a processing device, or a combination of hardware circuitry and program code. As depicted, the override module 260 may be a component of the rotation interrupt module 210. For example, the override module 260 may be a hardware component of the rotation interrupt module 210. As another example, the override module 260 may be a subroutine of the rotation interrupt module 210. However, in other embodiments the override module 260 may be an independent component communicatively coupled to the rotation interrupt module 210.

Figure 3A:
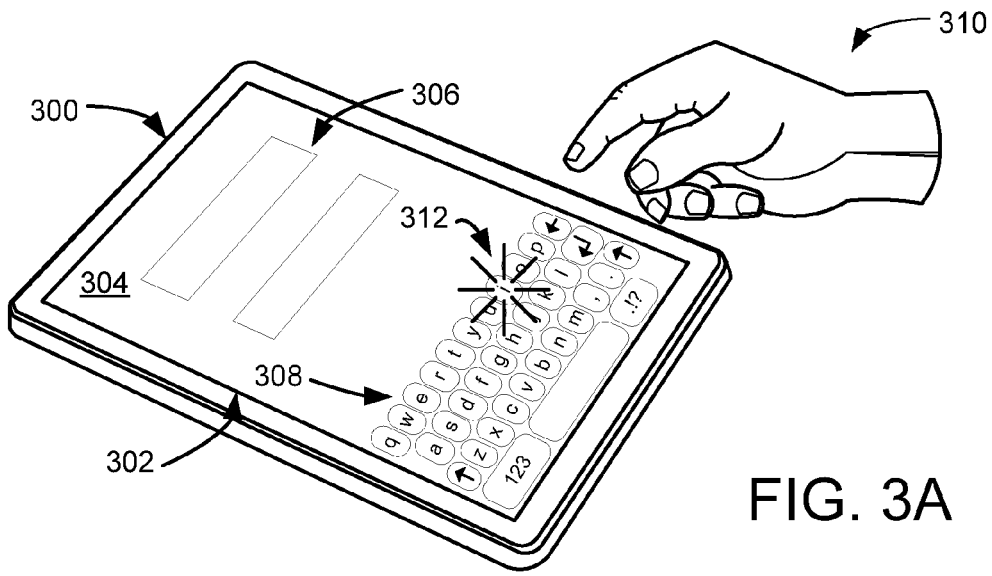
FIG. 3A is a diagram illustrating a mobile device that prevents a display from automatically rotating while receiving input from a user.

FIG. 3A as a block diagram depicting an embodiment of a mobile device 300 configured to prevent a display from automatically rotating while receiving input from user. The mobile device 300 may be one embodiment of the electronic device 105, discussed above with reference to FIGS. 1 and 2. For example, the mobile device 300 may include a processor 110, a memory 115, and a rotation module 130, as described above.

As depicted, the mobile device 300 includes a touchscreen display 302 configured to display a graphical user interface (GUI) 304. The GUI 304 includes a text input field 306 and an on-screen keyboard 308. The mobile device 300 is configured to detect user input activity 310 and to temporarily prevent rotation of the GUI 304 in response to detecting the user input activity 310. For example, the mobile device 300 may include a rotation module 130 that monitors for user input activity 310, prevents rotation of the GUI 304 for predetermined amount of time in response to detecting the user input activity 310, and allows rotation of the GUI 304 in response to expiration of the predetermined amount of time.

In one embodiment, the user input activity 310 may be detected in response to a user typing on the on-screen keyboard 308. In another embodiment, the user input activity 310 may be detected in response to text being inserted into the text input field 306. In a further embodiment, the user input activity 310 may be detected in response to the touchscreen display 302 detecting a plurality of single-tap touch events 312 within a time frame. In other embodiments, the user input activity 310 may be detected in response to voice input from the user, such as the user speaking a voice command (not shown).

In response to detecting the user input activity 310, the mobile device 300 prevents rotation of the GUI 304. As discussed above, preventing rotation of the GUI 304 may include monitoring for and blocking screen rotate events, locking the screen orientation, or the like. The mobile device 300 may prevent rotation of the GUI 304 for a predetermined amount of time.

The predetermined amount of time may be an amount of time selected based on the user's typing activity. For example, the predetermined amount of time may be based on an average amount of time it takes the user to input additional letters/characters on the on-screen keyboard 308, an average amount of time it takes the user to input additional text into the text input field 306, and the like. The predetermined amount of time is configured to identify when the user is done typing (or performing other user input activity 310). After expiration of the predetermined amount of time, the mobile device 300 allows rotation of the GUI 304. As discussed above, allowing rotation of the GUI 304 may include unlocking the screen orientation, ceasing to block screen rotate events, or the like.

In certain embodiments, the mobile device 300 may allow rotation of the GUI 304 prior to expiration of the predetermined amount of time in response to specific user input. For example, if the user performs a user input activity 310 indicative that the user is finished typing (or performing another user input activity 310), then the mobile device 300 may allow rotation of the GUI 304 even if the predetermined amount of time has not expired. Examples of actions indicative that the user has finished typing (or performing other user input activity 310) include, but are not limited to, the user pressing a "return" or "enter" button on the on-screen keyboard 308, the user pressing a "send" button in a messaging window on the GUI 304, the user selecting away from the text input field 306, the user setting down or releasing the mobile device 300, and the like.

Figure 3B:
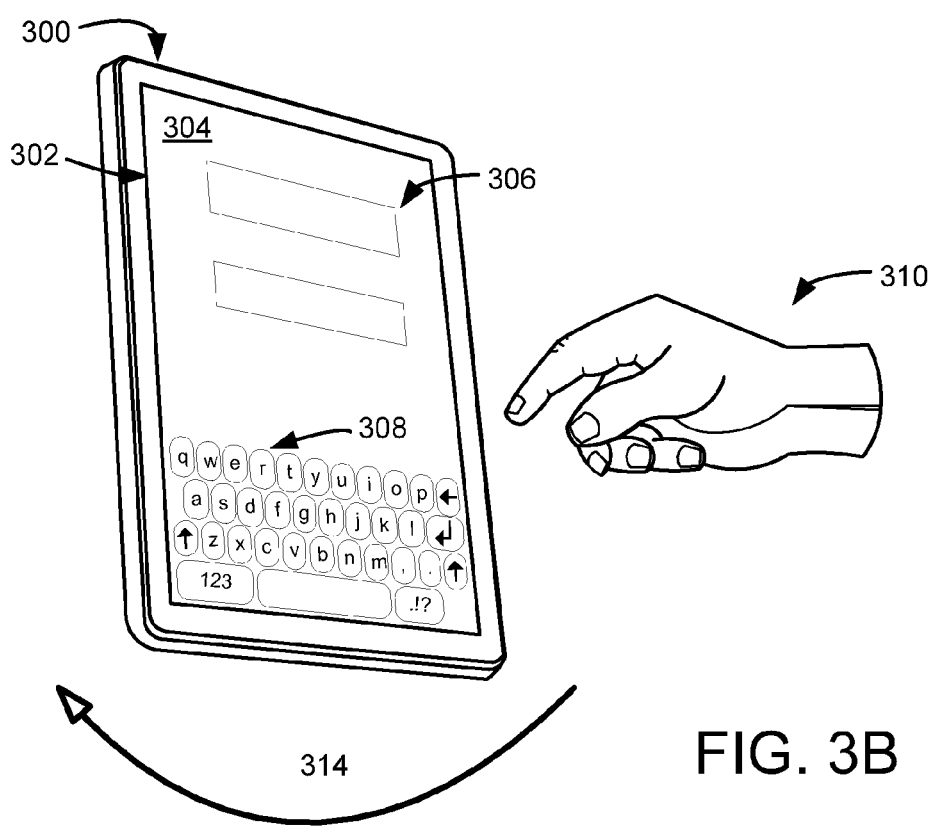
FIG. 3B is a diagram illustrating the mobile device of FIG. 3A preventing the display from automatically rotating.

FIG. 3B shows the mobile device 300 after being rotated 314 with respect to downward direction. In some embodiments, an orientation module 220 detects the rotation 314 and generates a screen rotate event in order to rotate the GUI 304 into new orientation based on the downward direction. However, here the rotation 314 occurs during the predetermined amount of time after user input activity 310 is detected at the device 300. Thus, the mobile device 300 prevents rotation of the GUI 304 in response to the rotation 314. In some embodiments, additional user input activity is detected during the predetermined amount of time after the initial user input activity 310. In response to detecting the additional user input activity, the mobile device 300 resets the predetermined amount of time during which the screen rotation is prevented.

While the mobile device 300 is depicted as receiving text input (e.g., via the on-screen keyboard 308), in other embodiments, the mobile device 300 is receiving control/command input, for example in response to the user playing a game on the mobile device 300. Thus, in certain embodiments the on-screen keyboard 308 may be replaced with a control area (e.g., an on-screen gaming control panel) for receiving user input activity 310. In such embodiments, the mobile device 300 may prevent rotation in response to detecting the user input activity 310, even when the user input activity 310 is not the input of text.

Figure 4:
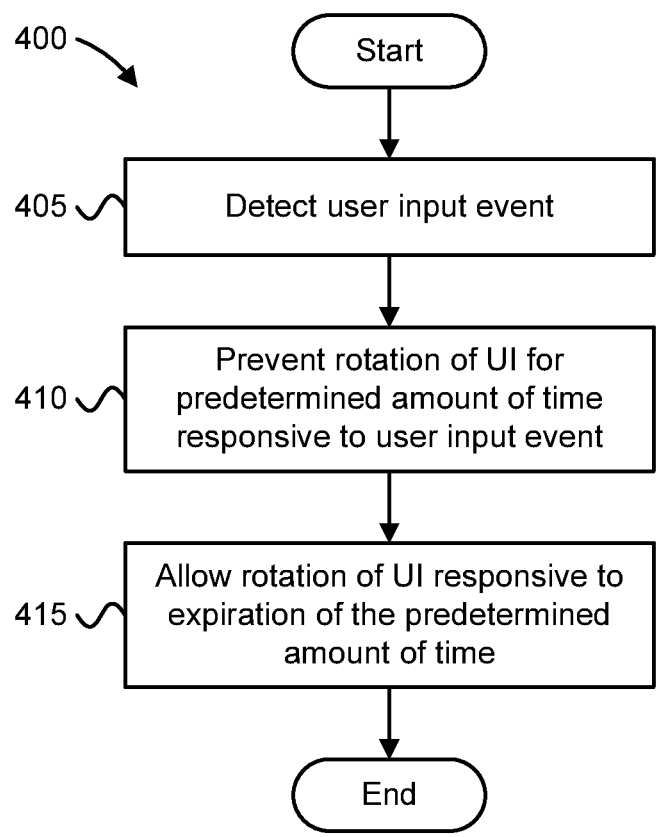
FIG. 4 is a schematic flow chart diagram illustrating one embodiment of a method for preventing a display from automatically rotating while receiving input from a user.

FIG. 4 is a schematic flow chart diagram illustrating a method 400 for preventing a display from automatically rotating while receiving input from a user, according to embodiments of the disclosure. In one embodiment, the method 400 is performed by the electronic device 105. In another embodiment, the method 400 may be performed by the apparatus 200. Alternatively, the method 400 may be performed by a processor 110 and a computer readable storage medium, such as the memory 115. The computer readable storage medium may store code that is executed on the processor 110 to perform the functions of the method 400.

The method 400 begins and detects 405 a user input event. In one embodiment, the input event module 205 detects 405 the user input event. In certain embodiments, detecting 405 the user input event includes detecting that the user is typing. Detecting that the user is typing may include detecting that an on-screen software keyboard is being used. Alternatively, detecting that the user is typing may include detecting text inserted into a text input field. In other embodiments, detecting 405 the user input event may include detecting a plurality of single-tab touch events with the in a threshold time frame. In further embodiments, detecting 405 the user input event may include detecting voice input.

The method 400 prevents 410 rotation of a user interface for a predetermined amount of time in response to user input event. In one embodiment, the rotation interrupt module 210 prevents 410 rotation of the user interface for the predetermined amount of time in response to the input event module 205 detecting 405 the user input event. In certain embodiments, preventing 410 rotation of a user may include monitoring for a screen rotation event and preventing reporting of a screen rotation event detected during the predetermined amount of time. In other embodiments, preventing 410 rotation of the user interface may include locking a screen orientation in response to the user input event.

The method 400 allows 415 rotation of the user interface in response to expiration of the predetermined amount of time. The method 400 ends. In one embodiment, the rotation interrupt module 210 allows 415 rotation of the user interface in response to expiration of the predetermined amount of time. In certain embodiments, allowing 415 rotation of the user interface includes unlocking a screen orientation in response to expiration of the predetermined amount of time.

Figure 5:
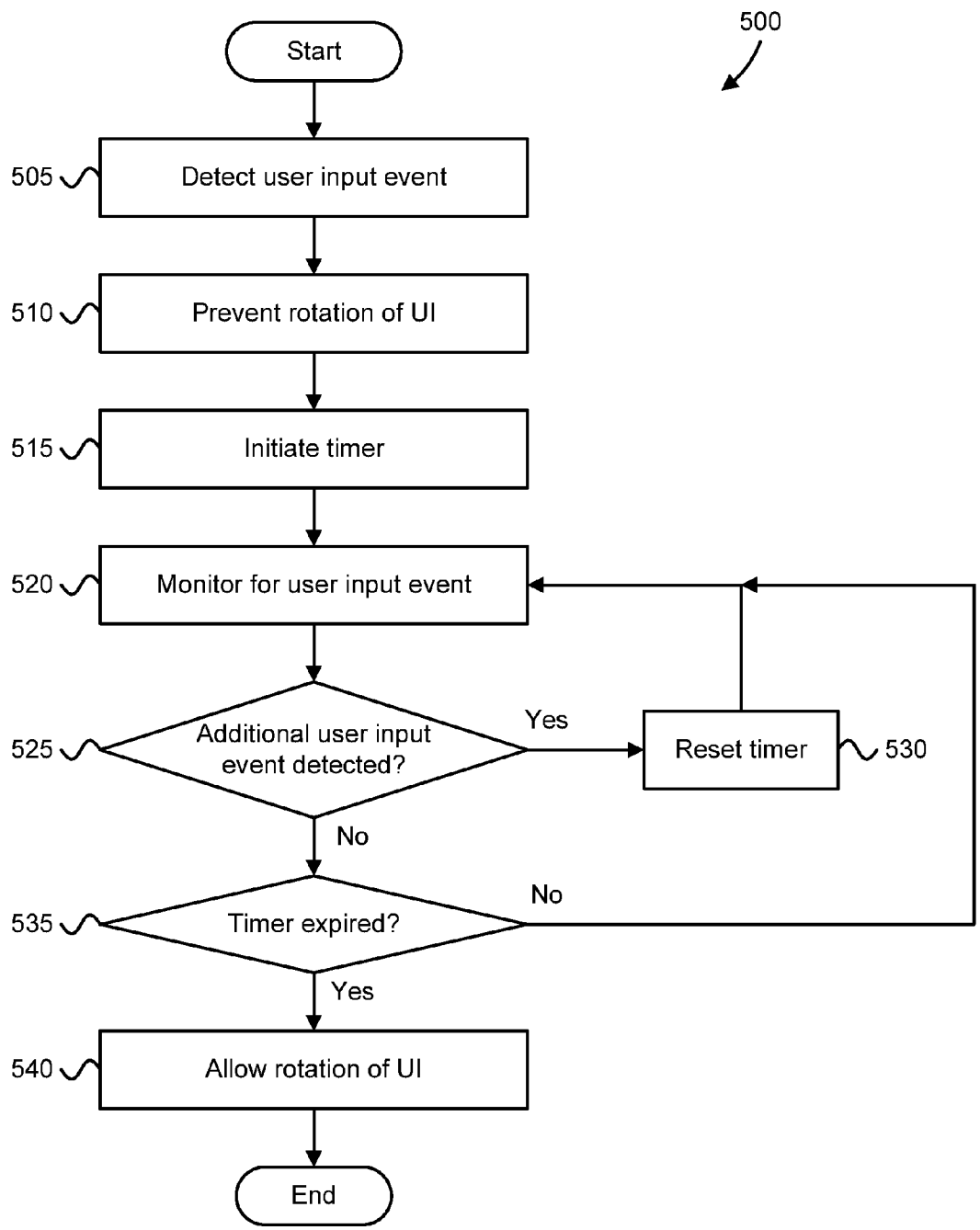
FIG. 5 is a schematic flow chart diagram illustrating another embodiment of a method for preventing a display from automatically rotating while receiving input from a user.

FIG. 5 is a schematic flow chart diagram illustrating a method 500 for preventing a display from automatically rotating while receiving input from a user, according to embodiments of the disclosure. In one embodiment, the method 500 is performed by the electronic device 105. In another embodiment, the method 500 may be performed by the apparatus 200. Alternatively, the method 500 may be performed by a processor 110 and a computer readable storage medium, such as the memory 115. The computer readable storage medium may store code that is executed on the processor 110 to perform the functions of the method 500.

The method 500 begins and detects 505 a user input event. In one embodiment, the input event module 205 detects 505 the user input event. In certain embodiments, detecting 505 the user input event includes detecting that the user is typing. Detecting that the user is typing may include detecting that an on-screen software keyboard is being used. Alternatively, detecting that the user is typing may include detecting text inserted into a text input field. In other embodiments, detecting 505 the user input event may include detecting a plurality of single-tab touch events with the in a threshold time frame. In further embodiments, detecting 505 the user input event may include detecting voice input.

The method 500 prevents 510 rotation of a user interface in response to user input event. In one embodiment, the rotation interrupt module 210 prevents 510 rotation of the user interface in response to the input event module 205 detecting 505 the user input event. In certain embodiments, preventing 510 rotation of a user may include monitoring for a screen rotation event and preventing reporting of a detected screen rotation event. For example, the event filter module 250 may filter out or block screen rotation events detected by the rotate event module 245. In other embodiments, preventing 510 rotation of the user interface may include locking a screen orientation in response to the user input event. For example, the screen off module 255 may lock a screen orientation in response to the user input event.

The method 500 initiates 515 a timer in response to preventing 510 rotation of the user interface. In one embodiment, the timer module 215 initiates 515 a timer in response to the rotation interrupt module 210 preventing 510 rotation of the user interface. The method 500 monitors 520 for additional user input events in response to initiating 515 the timer. In one embodiment, the input event module 205 monitors 520 for additional user input events in response to the timer module 215 initiating 515 the timer.

The method 500 determines 525 whether additional user input events have been detected. In response to detecting one or more additional user input events, the method 500 resets 530 the timer. In one embodiment, the timer module 215 resets 530 the timer in response to the input event module 205 detecting one or more additional user input events. Otherwise, in response to not detecting one or more additional user input events, the method 500 determines 535 whether the timer has expired. If the timer has not expired, the method 500 returns to monitoring 520 for additional user input events.

Otherwise, in response to determining 535 that the timer has expired, the method 500 allows 540 rotation of the user interface in response to expiration of the predetermined amount of time. The method 500 ends. In one embodiment, the rotation interrupt module 210 allows 540 rotation of the user interface in response to expiration of the predetermined amount of time. In certain embodiments, allowing 540 rotation of the user interface includes unlocking a screen orientation in response to expiration of the predetermined amount of time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display device for presenting a user interface, the user interface having a text input field;
an orientation sensor that determines an orientation of the display device with respect to a downward direction;
a processor;
a memory that stores code executable by the processor to:
present the user interface in a first screen orientation that aligns the user interface with the downward direction;
monitor for a text input event, wherein the text input event comprises at least one of: detecting two or more single-tap touch events within a threshold time frame and detecting the insertion of text into the text input field;
detect a change in the orientation of the display device;
allow rotation of the user interface in response to not detecting a text input event a predetermined amount of time prior to detecting the change in the orientation of the display device;
prevent rotation of the user interface in the first screen orientation for a predetermined amount of time in response to detecting the text input event;
allow rotation of the user interface to a second screen orientation that aligns the bottom of the user interface with the downward direction in response to the change in the orientation of the display device and in response to expiration of the predetermined amount of time; and
allow rotation of the user interface to the second screen orientation prior to expiration of the predetermined amount of time in response to a specific user input.

2. The apparatus of claim 1, wherein the processor further initiates a timer in response to detecting the text input event, the timer measuring the predetermined amount of time, wherein allowing rotation of the user interface in response to not detecting a text input event a predetermined amount of time prior to detecting the change in the orientation of the display device comprises allowing rotation of the user interface if the timer is not initiated and wherein allowing rotation of the displayed user interface in response to expiration of the predetermined amount of time comprises allowing rotation of the displayed user interface in response to expiration of the timer.

3. The apparatus of claim 1, wherein detecting a change in the orientation of the display device comprises the processor monitoring for a screen rotation event, wherein preventing rotation of a displayed user interface for a predetermined amount of time comprises preventing reporting of the screen rotation event, wherein allowing rotation of the user interface in response to expiration of the predetermined amount of time comprises passing along the screen rotation event.

4. The apparatus of claim 1, wherein the processor further:
detects an additional user input event during the predetermined amount of time; and
resets the predetermined amount of time in response to the additional user input.

5. The apparatus of claim 1, wherein detecting a text input event further comprises detecting whether an on-screen software keyboard is being used.

6. The apparatus of claim 1, wherein the threshold time frame is selected using an average amount of time between successive key presses of an on-screen keyboard.

7. The apparatus of claim 1, wherein the processor further allows rotation of the user interface to the second screen orientation prior to expiration of the predetermined amount of time in response to detecting a user action indicative that the user has finished text input, wherein the user action comprises one of: the user pressing a "return" or "enter" button of an on-screen keyboard, the user pressing a "send" button in a messaging window displayed on the user interface, the user selecting away from the text input field, the user setting down the apparatus, and the user releasing hold of the apparatus.

8. A method comprising:
determining an orientation of a display device with respect to a downward direction, the display device comprising a touchscreen display;
presenting a user interface in a first screen orientation that aligns the user interface with the downward direction, the user interface having a text input field;
detecting, by use of a processor, a text input event, wherein the text input event comprises at least one of: detecting two or more single-taps to the touchscreen display within a threshold time frame and detecting the insertion of text into the text input field;
detecting a change in the orientation of the display device;
allowing rotation of the displayed user interface in response to not detecting a text input event a predetermined amount of time prior to detecting the change in the orientation of the display device;
maintaining the displayed user interface in the first screen orientation for a predetermined amount of time in response to detecting the text input event; and
allowing rotation of the displayed user interface to a second screen orientation that aligns the bottom of the user interface with the downward direction in response to the change in the orientation of the display device and in response to expiration of the predetermined amount of time.

9. The method of claim 8, further comprising initiating a timer in response to detecting the text input event, the timer measuring the predetermined amount of time.

10. The method of claim 9, wherein allowing rotation of the displayed user interface in response to expiration of the predetermined amount of time comprises allowing rotation of the displayed user interface in response to expiration of the timer.

11. The method of claim 8, wherein detecting a change in the orientation of the display device comprises monitoring for a screen rotation event, wherein preventing rotation of a displayed user interface for a predetermined amount of time comprises preventing reporting of the screen rotation event, wherein allowing rotation of the displayed user interface in response to expiration of the predetermined amount of time comprises passing along the screen rotation event.

12. The method of claim 8, further comprising:
   detecting an additional text input event during the predetermined amount of time; and
   resetting the predetermined amount of time in response to the additional user input.

13. The method of claim 8, wherein detecting a text input event further comprises detecting that a user is typing.

14. The method of claim 13, wherein detecting that a user is typing comprises detecting that an on-screen software keyboard is being used.

15. The method of claim 8, further comprising:
   allowing rotation of the user interface to the second screen orientation prior to expiration of the predetermined amount of time in response to detecting a user action indicative that the user has finished text input,
   wherein the user action comprises one of: the user pressing a "return" or "enter" button of an on-screen keyboard, the user pressing a "send" button in a messaging window displayed on the user interface, the user selecting away from the text input field, the user setting down the apparatus, and the user releasing hold of the apparatus.

16. A program product comprising a computer readable storage medium that is not a transitory signal and that stores code executable by a processor, the executable code comprising code to perform:
   determining an orientation of a display device with respect to a downward direction, the display device comprising a touchscreen display;
   presenting a user interface in a first screen orientation that aligns the user interface with the downward direction, the user interface having a text input field;
   monitoring for a text input event, wherein the text input event comprises at least one of: detecting two or more single-taps to the touchscreen display within a threshold time frame and detecting the insertion of into the text input field;
   detecting a change in the orientation of the display device while the text input field is actively displayed in the user interface;
   allowing rotation of the displayed user interface in response to not detecting a text input event a predetermined amount of time prior to detecting the change in the orientation of the display device;
   preventing rotation of the displayed user interface in the first screen orientation for a predetermined amount of time in response to detecting the text input event; and
   allowing rotation of the displayed user interface to a second screen orientation that aligns the bottom of the user interface with the downward direction in response to the change in the orientation of the display device and in response to expiration of the predetermined amount of time.

17. The program product of claim 16, the code further to perform initiating a timer in response to detecting the text input event, the timer measuring the predetermined amount of time.

18. The program product of claim 16, the code further to perform:
   detecting an additional text input event during the predetermined amount of time; and
   resetting the predetermined amount of time in response to the additional user input.

19. The program product of claim 16, wherein detecting the text input event further comprises an action selected from the group comprising: detecting that an on-screen software keyboard is being used and detecting a voice input from the user.

20. The program product of claim 16, wherein the code further:
   allows rotation of the user interface to the second screen orientation prior to expiration of the predetermined amount of time in response to detecting a user action indicative that the user has finished text input,
   wherein the user action comprises one of: the user pressing a "return" or "enter" button of an on-screen keyboard, the user pressing a "send" button in a messaging window displayed on the user interface, the user selecting away from the text input field, the user setting down the apparatus, and the user releasing hold of the apparatus.

* * * * *